March 3, 1931.  E. P. McLEOD  1,794,470
GROUND SANDING APPARATUS
Filed Jan. 3, 1928   2 Sheets-Sheet 1
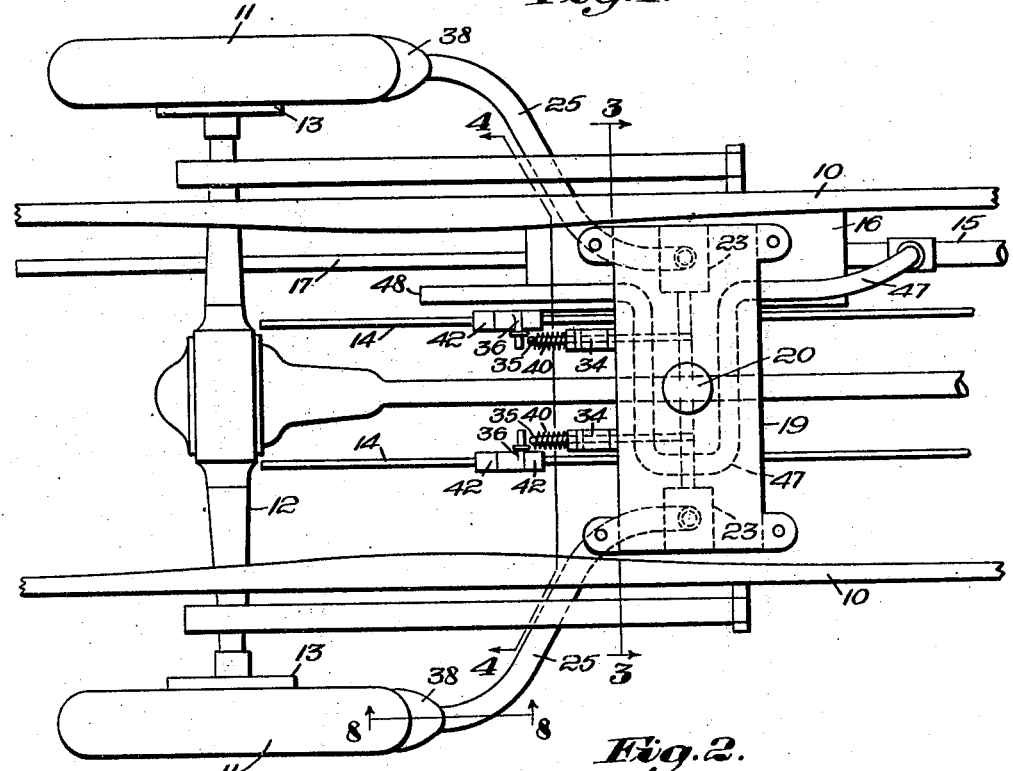
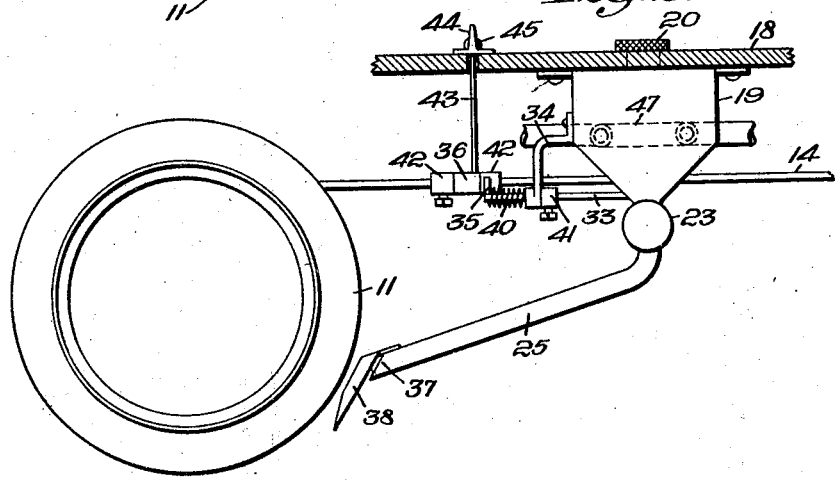
Inventor:
Edward P. McLeod March 3, 1931.  E. P. McLEOD  1,794,470
GROUND SANDING APPARATUS
Filed Jan. 3, 1928   2 Sheets-Sheet 2
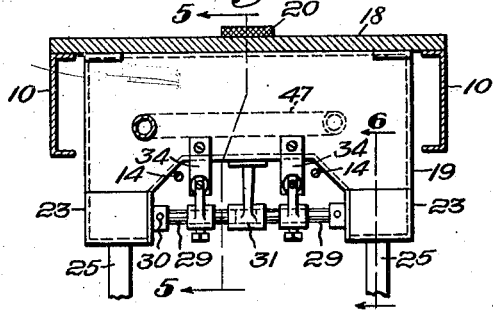
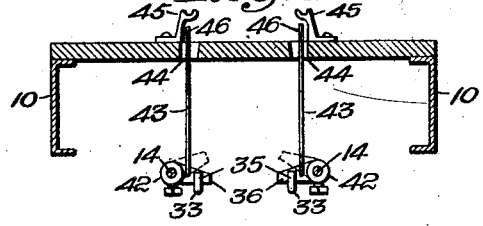
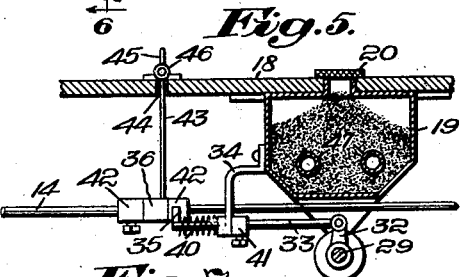
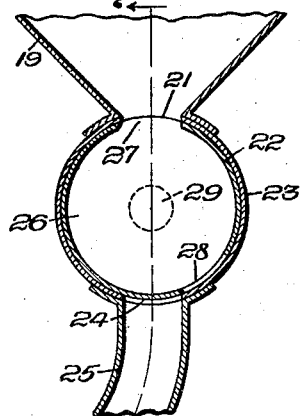
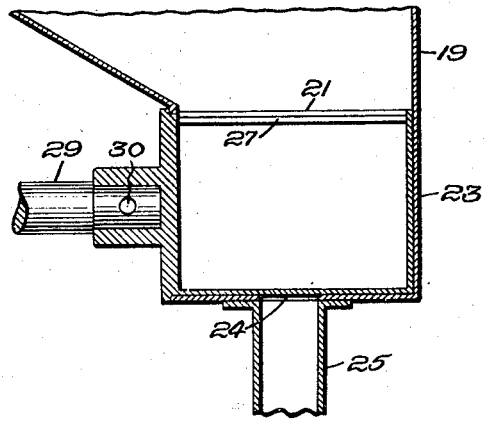
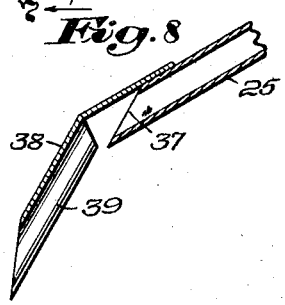
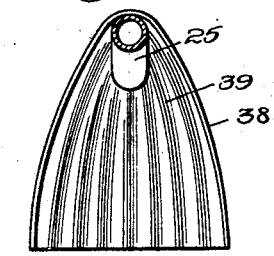
Inventor:
Edward P. McLeod Patented Mar. 3, 1931

1,794,470

UNITED STATES PATENT OFFICE

EDWARD P. McLEOD, OF LEXINGTON, MASSACHUSETTS

GROUND-SANDING APPARATUS

Application filed January 3, 1928. Serial No. 244,063.

This invention relates to ground sanding apparatus for motor-driven land vehicles, and will be best understood by reference to the following description, when taken in connection with the accompanying drawings of one specific embodiment thereof, while its scope will be more particularly pointed out in the appended claims.

In the drawings:

Fig. 1 is a plan of a portion of a motor-driven land vehicle equipped with ground sanding apparatus embodying the invention;

Fig. 2 is a side elevation, partly in vertical section, of a portion of the same;

Fig. 3 is a sectional view, on line 3—3 of Fig. 1;

Fig. 4 is a sectional view, on line 4—4 of Fig. 1;

Fig. 5 is a sectional view, on line 5—5 of Fig. 3;

Fig. 6 is a sectional view, on an enlarged scale, on line 6—6 of Fig. 3;

Fig. 7 is a sectional view, on line 7—7 of Fig. 6;

Fig. 8 is a sectional view, on line 8—8 of Fig. 1; and

Fig. 9 is a front elevation of the parts shown in Fig. 8.

Referring to the drawings, and to the embodiment of the invention which is selected for exemplification, and having reference at first to Fig. 1, there is shown a portion of a motor vehicle of common form, having a frame comprising side members 10, ground-engaging wheels 11, herein the driving wheels, carried by an axle 12, and provided with brakes 13 operated by brake rods 14, which extend longitudinally of the vehicle, and are customarily connected together by an equalizer not shown herein. An exhaust pipe 15 leads to a muffler 16, and another pipe, sometimes called the exhaust tail pipe 17, leads from the outlet to the muffler. The vehicle has a usual floor, a portion of which is shown at 18 in Fig. 2.

The ground sanding apparatus of my invention will now be described, reference being had at first to Fig. 2. Supported on an appropriate part of the vehicle, such as the under side of the floor, is a sand receptacle 19, having a filling cap 20 conveniently located for the introduction of sand into the receptacle from a point above the floor. The receptacle has one or more, herein two outlets 21 (see Fig. 6), each of which is controlled by a suitable closure, herein a valve 22 working in a valve casing 23, the latter having an outlet 24 leading to a discharge pipe 25.

The construction of the valve in its casing is such that the valve, during its movement in one direction, starts and then stops the flow of sand to the ground. In the present example, this is conveniently accomplished by making the valve in the form of a cylinder, or drum, having therein a chamber 26 provided with an inlet port 27 and an outlet port 28, whose range is such that when the valve is in one position, the chamber receives sand from the receptacle, and when it is in another position, it discharges the sand onto the ground. This is conveniently accomplished by so arranging the ports that they are not diametrically opposite; that is to say, when the port 27 is in registration with the port 21, the port 28 is out of registration with the port 24, and conversely, when the port 28 is in registration with the port 24, the port 27 is out of registration with the port 21. This prevents waste of the sand, as will presently appear.

In the present example, the valves are rocked by two axially-aligned, but separate shafts 29 (see Fig. 3), each of which is secured to its respective valve as at 30, at one end, while its other end is mounted in a bearing presented by a bracket 31 (see Fig. 2) conveniently secured to the receptacle 19. Appropriate means are provided, connecting each rockshaft with one of the brakes, to cause sand to be released contemporaneously with the application of the brake. One convenient means of accomplishing this will now be described, reference being had to Figs. 4 and 5.

Secured to each rockshaft is an arm 32, to which there is pivoted a rod 33, mounted to slide in a suitable guide presented by a bracket 34 secured to the receptacle 19. This rod is provided with a lateral projection or lug 35, which lies in the normal path of a projection, herein an arm 36 carried by the associated brake rod 14. When, therefore, the brake rod is moved in a forward direction for the application of the brake, the arm 36 engages the lug 35 and moves the rod 33 in a forward direction, thus rocking the valve shaft 22. The valve is therefore movable from the position shown in Fig. 6 to a position in which the port 21 is closed, and the port 24 is opened, thereby discharging the contents of the chamber 26 into the outlet pipe 25, the latter having an outlet orifice 37 (see Fig. 8) adjacent a spreader 38, which spreads the sand laterally. In the present example, this is conveniently accomplished by providing the spreader with a plurality of diverging grooves or passages 39 (see Fig. 9). Thus, the sand is spread laterally in the path of the associated wheel 11. Referring again to Fig. 5, when the brake is restored to its normal position, the valve is likewise restored to its normal position by a suitably arranged spring 40, herein disposed between the bracket 34 and the lug 35. Movement of the valve under the influence of said spring is limited by appropriate means, herein a collar 41, secured to the shaft, and adapted to engage the bracket 34. To maintain the sand in a dry, free-running condition, means are provided for heating the same (see Fig. 1) by a heater pipe 47, which leads from the exhaust pipe 15 into and through the sand receptacle 19, said pipe having an outlet orifice at 48.

When the road conditions are such that no sanding is required, the apparatus is conveniently rendered inoperative by lifting the two arms 36 (see Figs. 4 and 5) out of the paths of the respective lugs 35, each arm to this end being loosely mounted on and about the associated brake rod, and between two collars 42 secured to said rod. The lifting of these arms is conveniently accomplished by means of rods 43, extending from said arms in an upward direction through openings 44 provided in the floor 18. They may be secured in this elevated position by suitable means, herein hooks 45, onto which eyes 46 on the upper ends of the rods may be hooked, when the rods have been elevated. This renders the sanding apparatus temporarily inoperative. This is desirable, of course, at such times as the ground is bare and dry. When, however, the ground is wet with rain, or slippery with ice or snow, the rods are unhooked and dropped, thereby rendering the apparatus effective once more with each application of the brake.

Having thus described one embodiment of the invention, but without limiting myself thereto, what I claim and desire by Letters Patent to secure is:

1. In a land vehicle, the combination of a ground-engaging wheel, a brake for said wheel, a brake-operating rod extending lengthwise of the vehicle, means for depositing sand on the ground in the path of said wheel, including a valve controlling the deposit of sand, means including a member projecting laterally from said rod providing an operative connection between said brake-operating rod and said valve to cause sand to be deposited contemporaneously with the application of said brake, and means at will to move said member about the axis of said rod to interrupt said connection.

2. In a land vehicle, the combination of a ground-engaging wheel, a brake for said wheel, and means for depositing sand on the ground in the path of said wheel, said means including a valve casing having two diametrically opposite openings, one above the other, and a hollow valve rotatable in said casing and having two non-aligned openings, one above the other, the upper opening in said valve normally registering with the upper opening in said casing, the lower opening in said valve being normally out of registration with the lower opening in said casing, and means to turn said valve to cause its upper opening to be moved out of registration with the upper opening of said casing and to cause the lower opening of said valve to be moved into registration with the lower opening of said casing.

3. In a land vehicle, the combination of a ground-engaging wheel, a brake for said wheel, and means for depositing sand on the ground in the path of said wheel, said means presenting a casing having an inlet port for the admission of sand thereto and an outlet port for the discharge of sand therefrom, and a closure having non-aligned inlet and outlet ports, the inlet port of said closure normally registering with the inlet port of said casing and the outlet port of said closure being normally out of registration with the outlet port of said casing.

4. In a land vehicle, the combination of a ground-engaging wheel, a brake for said wheel, and means for depositing sand on the ground in the path of said wheel, said means including a conduit having a discharge orifice, and an open spreader against which said orifice discharges the sand.

5. In a land vehicle, the combination of a ground-engaging wheel, a brake for said wheel, and means for depositing sand on the ground in the path of said wheel, said means including a conduit having a discharge orifice, and an open spreader against which said orifice discharges the sand, said spreader having diverging open grooves which divide the stream of sand into a plurality of streams.

In testimony whereof, I have signed my name to this specification.

EDWARD P. McLEOD.